(12) United States Patent
Richardson

(10) Patent No.: US 7,596,585 B2
(45) Date of Patent: Sep. 29, 2009

(54) OBJECT REPLICATION USING INFORMATION QUALITY OF SERVICE

(75) Inventor: James P. Richardson, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 614 days.

(21) Appl. No.: 10/980,778

(22) Filed: Nov. 3, 2004

(65) Prior Publication Data

US 2006/0106894 A1    May 18, 2006

(51) Int. Cl.
 *G06F 17/30* (2006.01)
(52) U.S. Cl. .................. 707/203; 711/161; 711/162; 711/151; 707/8; 707/10; 707/104.1; 707/204; 714/5
(58) Field of Classification Search .............. 707/203; 711/161–162, 151
See application file for complete search history.

(56) References Cited

U.S. PATENT DOCUMENTS

| 5,471,629 | A |   | 11/1995 | Risch |
|---|---|---|---|---|
| 5,655,081 | A |   | 8/1997 | Bonnell et al. |
| 5,765,171 | A |   | 6/1998 | Gehani et al. |
| 5,826,239 | A | * | 10/1998 | Du et al. .................. 705/8 |
| 5,870,765 | A |   | 2/1999 | Bauer et al. |
| 5,966,706 | A |   | 10/1999 | Biliris et al. |
| 6,098,078 | A |   | 8/2000 | Gehani et al. |
| 6,104,929 | A | * | 8/2000 | Josse et al. ............. 455/445 |
| 6,292,803 | B1 | * | 9/2001 | Richardson et al. ........ 707/102 |
| 6,397,352 | B1 |   | 5/2002 | Chandrasekaran et al. |
| 6,434,622 | B1 | * | 8/2002 | Monteiro et al. ............. 709/231 |
| 6,453,404 | B1 | * | 9/2002 | Bereznyi et al. ............ 711/171 |
| 6,484,204 | B1 | * | 11/2002 | Rabinovich .................. 709/226 |
| 6,567,813 | B1 | * | 5/2003 | Zhu et al. .................. 707/100 |
| 6,567,846 | B1 | * | 5/2003 | Garg et al. .................. 709/218 |
| 6,584,548 | B1 | * | 6/2003 | Bourne et al. ............... 711/134 |
| 6,708,187 | B1 | * | 3/2004 | Shanumgam et al. ....... 707/201 |
| 7,088,710 | B1 | * | 8/2006 | Johnson et al. ............. 370/357 |
| 7,124,204 | B2 | * | 10/2006 | Givoly et al. ............... 709/248 |
| 7,349,340 | B2 | * | 3/2008 | Sahai et al. .................. 370/235 |
| 2001/0039548 | A1 | * | 11/2001 | Shinkai et al. .............. 707/201 |
| 2002/0051464 | A1 | * | 5/2002 | Sin et al. .................... 370/466 |
| 2002/0129022 | A1 |   | 9/2002 | Majewski et al. |
| 2003/0005120 | A1 | * | 1/2003 | Mutalik et al. .............. 709/225 |
| 2003/0009753 | A1 |   | 1/2003 | Brodersen et al. |
| 2003/0084361 | A1 |   | 5/2003 | Lawrence et al. |
| 2003/0119501 | A1 |   | 6/2003 | Kim |

(Continued)

OTHER PUBLICATIONS

Discrete and Combinatorial Mathematics: An Applied Introduction, Fourth Edition. Ralph P. Grimaldi, Addison Wesley Longman, Inc. 1999. pp. 59.*

(Continued)

*Primary Examiner*—Neveen Abel Jalil
*Assistant Examiner*—Mark Andrew X Radtke
(74) *Attorney, Agent, or Firm*—Fogg & Powers LLC

(57) ABSTRACT

A database replication function for a local object and one or more destination objects, where one or more local applications make requests to the source objects is disclosed. A request logging function records requests sent by the one or more local applications into a memory log. An update propagation function determines which source object states must be propagated to one or more destination objects based on information quality of service accuracy requirements.

26 Claims, 7 Drawing Sheets

U.S. PATENT DOCUMENTS

| | | | |
|---|---|---|---|
| 2003/0204596 A1* | 10/2003 | Yadav | 709/226 |
| 2003/0225760 A1 | 12/2003 | Ruuth et al. | |
| 2004/0030739 A1* | 2/2004 | Yousefi'zadeh | 709/201 |
| 2004/0111390 A1 | 6/2004 | Saito et al. | |
| 2004/0117802 A1* | 6/2004 | Green | 719/318 |
| 2004/0133591 A1 | 7/2004 | Holenstein et al. | |
| 2004/0148570 A1 | 7/2004 | Sengodan | |
| 2004/0193952 A1* | 9/2004 | Narayanan et al. | 714/13 |
| 2004/0246914 A1* | 12/2004 | Hoang et al. | 370/254 |
| 2004/0249870 A1 | 12/2004 | Jeevanjee et al. | |
| 2005/0022012 A1* | 1/2005 | Bluestone et al. | 713/201 |
| 2005/0278385 A1* | 12/2005 | Sutela et al. | 707/200 |
| 2006/0171523 A1* | 8/2006 | Greenwell | 379/242 |

OTHER PUBLICATIONS

Abadi et al., Aurora: a new model and architecture for data stream management, The VLDB Journal, 2003, pp. 120-139, vol. 12, Publisher: Springer-Verlag.

Gifford, Weighted Voting for Replicated Data, 1979, pp. 150-162, vol. 79, Publisher: ACM.

Gray et al., Transaction Processing: Concepts and Techiques, 1993, p. 2 pgs., Publisher: Morgan Kaufmann Publishers.

Gray et al., The Dangers of Replication and a Solution, International Conference on Management of Data, Proceedings of the 1996 ACM SIGMOD international conference on Management of data, 1996, pp. 173-182, Publisher: ACM, Published in: Montreal, Quebec, Canada.

Honeywell Inc., Uniformance PHD 200—Process History Database System Manual, Uniformance, Apr. 2003, pp. 1-14, 87-93.

Lin et al., A Probablity-Based Approach of Transaction Consistency in Mobile Environments, Proceedings of the 2001 Int'l Conference on Computer Networks and Mobile Computing, 2001, p. 8 pgs., Publisher: IEEE.

Liu et al., WebCQ—Detecting and Delivering Information Changes on the Web, 2000, pp. 512-519, Publisher: ACM.

Olston et al., Adaptive Filters for Continuous Queries over Distributed Data Streams, SIGMOD 2003, 2003, pp. 563-574, Publisher: ACM.

Burroughs et al., Oracle9i—Advanced Replication, Release 2 (9.2), Mar. 2002, pp. i-xxxvi, 1-1-1-20, Publisher: Oracle.

OSI Software, Inc., Data Archive for VMS, 1985, pp. i-x, 1-2, 75-90, Publisher: OSI Software, Inc.

Richardson et al., Computing and Communications Infrastructure for network-centric warfare: Exploiting COTS, assuming performance, Submitted to: 2004 Command and Control Research and Technology Symposium—The Power of Information Age Concepts and Technolgoies—Topic: C4ISR/C2 Architecture Jun. 2004, pp. 1-25.

Terry, Towards a Quality of Service Model for Replicated Data Access, Proceedings of the 1995 Workshop on Physics and Computer Modeling of Devices Based on Low-Dimensional Structures (PHYSICS '95), 1995, pp. 118-121, Publisher: IEEE.

Wei et al., QoS Management in Replicated Real-Time Databases, Proceddings of the 24h IEEE International Real-Time Systems Symposium, 2003, p. 12 pgs., Publisher: IEEE.

Ye et al., Pushing Quality of Service Information an Requirements into Global Query Optimization, Proceedings of the Seventh Ideas '03, 2003, p. 10 pgs., Publisher: The Computer Society.

Yu et al., Design and Evaluation of a Conit-Based Continuous Consistency Model for Replicated Services, 2002, pp. 239-282, vol. 20, No. 3, Publisher: ACM Transactions on Computer Systems.

* cited by examiner

OBJECT REPLICATION USING INFORMATION QUALITY OF SERVICE

TECHNICAL FIELD

The present invention generally relates to computer databases and more specifically to synchronization of duplicate databases on a network.

BACKGROUND

A typical computer network comprises a plurality of computers linked by a communications network. Applications running on these computers need to share information. One solution is to host a database on one of the computers, and have applications, regardless of their location, read and update this database. This client-server solution works well in many situations, but is less effective when network bandwidth or availability is marginal, when the server cannot accommodate the applications' database access workload, and when the server is an unacceptably risky single point of failure.

An alternative that addresses these issues is to replicate the database on some or all of the computers. On each computer, applications read and update the local database by sending it requests and the database sends a response to each request once it is completed. The challenge in this configuration is to keep the database replicas consistent with each other. One way this can be accomplished is through eager replication in which each update is propagated and applied to every database before confirming completion to the requesting application. Furthermore, updates are applied in the same order to all databases to ensure that the databases remain consistent with each other. Compared to the client-server approach, eager replication provides improved query performance and query availability in the face of network and node failure. However, update performance is actually lower and updates cannot be performed during network or node outages because communication links between nodes are broken. These issues can be addressed using a quorum-based approach, at the cost of poorer query performance and availability. Another way to keep the database replicas consistent is through lazy replication. With lazy replication, each application sends requests to its local database, and receives a confirming response as soon as the request is processed locally. Subsequently, a replication function propagates the local updates to other computers and applies them to those computers' databases. If communications connectivity is temporarily broken, update propagation is delayed but local database request processing continues.

One problem with the state of the art in database replication is that neither eager replication nor existing lazy replication methods adequately addresses reducing communication network resource costs while still maintaining reasonable levels of database synchronization.

Commercial database management products such as Oracle implement lazy replication. Two approaches commonly used by these products are data-level replication and procedure-level replication. With data-level replication, the requests propagated are inserts, updates, and deletes. Request reordering and compression are used. With procedure-level replication, the requests are arbitrary procedures but request reordering and compression are not used. Neither approach attempts to reduce communication network resource costs while still ensuring that information in database replicas meet reasonable synchronization requirements for the defined mission of the database.

One form of database compression, used typically to reduce data storage costs, is known as process data historians. Process data historians use a compression technique called the "swinging door algorithm" that eliminates samples that can be reconstructed with acceptable accuracy through interpolation from surrounding samples. However, interpolation was not defined for arbitrarily complex state spaces, so it is limited in application to simple scalar data such as found in process control systems.

For the reasons stated above and for other reasons stated below which will become apparent to those skilled in the art upon reading and understanding the specification, there is a need in the art for database replication which reduces communication network resource costs while providing reasonably reliable data.

SUMMARY

The Embodiments of the present invention address the problem of reducing network resource costs through the application of information quality of service requirements, as well as other problems and will be understood by reading and studying the following specification.

Embodiment of the present invention provide levels of database synchronization, as defined by the accuracy of data contained in database replicas and the amount of delay in propagating updates to database replicas (i.e. the freshness of the information in the database replica), that are acceptable given the particular mission of the database, while reducing communication network resource costs.

In one embodiment, a database replication function for a source object and one or more destination objects where one or more local applications that make requests of the source object, is disclosed. A request logging function records the requests sent by the one or more applications to the source object into a memory log. An update propagation function determines which source object states must be propagated to the one or more destination objects based on information quality of service accuracy requirements.

In another embodiment, a database system is disclosed. The database system comprising a local object having a container object structure, one or more destination objects having the same container object structure as the local object, and one or more local applications adapted to make requests to the source object. A request logging function within the database system is adapted to record a sequence of requests sent by the one or more applications to the source object. An update propagation function determines which source object states to propagate to the one or more destination objects, based on information quality of service accuracy requirements.

In yet another embodiment, a method for propagating database updates is disclosed. The method comprises logging requests made to a source object by one or more applications. The method continues with determining the magnitude of the source object state change since the most recent previous update propagation and determining if the magnitude of the source object state change is greater than or equal to an information quality of service accuracy parameter $\Delta s$. Then the method continues with determining if the present source object state has existed on the source object for a time greater than or equal to an information quality of service accuracy parameter $\Delta t$ without being propagated to the destination object. The method then proceeds with propagating updates to one or more destination databases, if the magnitude of the source object state change is greater than or equal to $\Delta s$ and the present source object state has existed on the source object for a time greater than or equal to $\Delta t$ without being propagated to the one or more destination objects.

In yet another embodiment, another method for propagating database updates is disclosed. The method comprises logging requests made to a source object by one or more applications, periodically determining if the magnitude of a source object state change, since the time of the most recent previous update propagation, is greater than or equal to an information quality of service accuracy parameter $\Delta s$ and if the present source object state has existed on the source object for a time greater than or equal to an information quality of service accuracy parameter $\Delta t$ without being propagated to the destination object. When the magnitude of the source object state change is greater than or equal to $\Delta s$ and the present source object state has existed on the source object for a time greater than or equal to $\Delta t$ without being propagated to the one or more destination objects, the method continues with applying a compression algorithm that transforms the logged requests into a compressed sequence of requests and propagating the compressed sequence of request to one or more destination objects, wherein the cycle period for periodically determining the magnitude of the source object state change is chosen so that information quality of service timing requirements are not exceeded.

In yet another embodiment, another method for propagating database updates is disclosed. The method comprising logging requests made to a source object by one or more applications, determining the magnitude of a source object state change since the time of the most recent previous update propagation and determining if the magnitude of the source object state change is greater than or equal to an information quality of service accuracy parameter $\Delta s$. When the magnitude of the source object state change is greater than or equal to $\Delta s$, the method continues with propagating a sequence of updates based on the logged requests to one or more destination databases.

In yet another embodiment, another method for propagating database updates is disclosed. The method comprising logging requests made to a source object by one or more applications, determining the magnitude of a source object state change since the time of the most recent previous update propagation and determining if the magnitude of the source object state change is greater than or equal to an information quality of service accuracy parameter $\Delta s$. When the magnitude of the source object state change is greater than or equal to $\Delta s$, the method continues with applying a compression algorithm that transforms the logged requests into a compressed sequence of requests to produce the sequence of updates and propagating a sequence of updates based on the logged requests to one or more destination databases.

In still another embodiment, a method for propagating database updates, where the method is embedded in a computer-readable medium, is disclosed. The method comprises logging requests made to a source object by one or more applications. The method continues with determining the magnitude of the source object state change since the most recent previous update propagation and determining if the magnitude of the source object state change is greater than or equal to an information quality of service accuracy parameter $\Delta s$. Next, the method continues with determining if the present source object state has existed on the source object for a time greater than or equal to an information quality of service accuracy parameter $\Delta t$ without being propagated to the destination object. The method then proceeds with propagating updates to one or more destination databases, if the magnitude of the source object state change is greater than or equal to $\Delta s$ and the present source object state has existed on the source object for a time greater than or equal to $\Delta t$ without being propagated to the one or more destination objects.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout Figures and text.

DETAILED DESCRIPTION

Reducing communication cost is important in environments, such as wireless networks, where bandwidth is at a premium and availability is intermittent. Lazy replication keeps database replicas synchronized by propagating updates applied to one object (e.g. a source database) to other objects (e.g. destination databases). Embodiments of the present invention take into consideration information quality of service requirements (in terms of tolerable synchronization time freshness requirements and accuracy requirements) to reduce network resource related communication costs for propagating database updates between computers on a network.

Embodiments of the present invention have two elements. The first element involves compression of the sequence of source database updates into a shorter sequence of destination database updates, while still keeping the replicas acceptably synchronized. The second element is to define precisely, in terms of information quality of service (IQoS) freshness and accuracy requirements, what constitutes acceptable synchronization of the database replicas.

Figure 1:
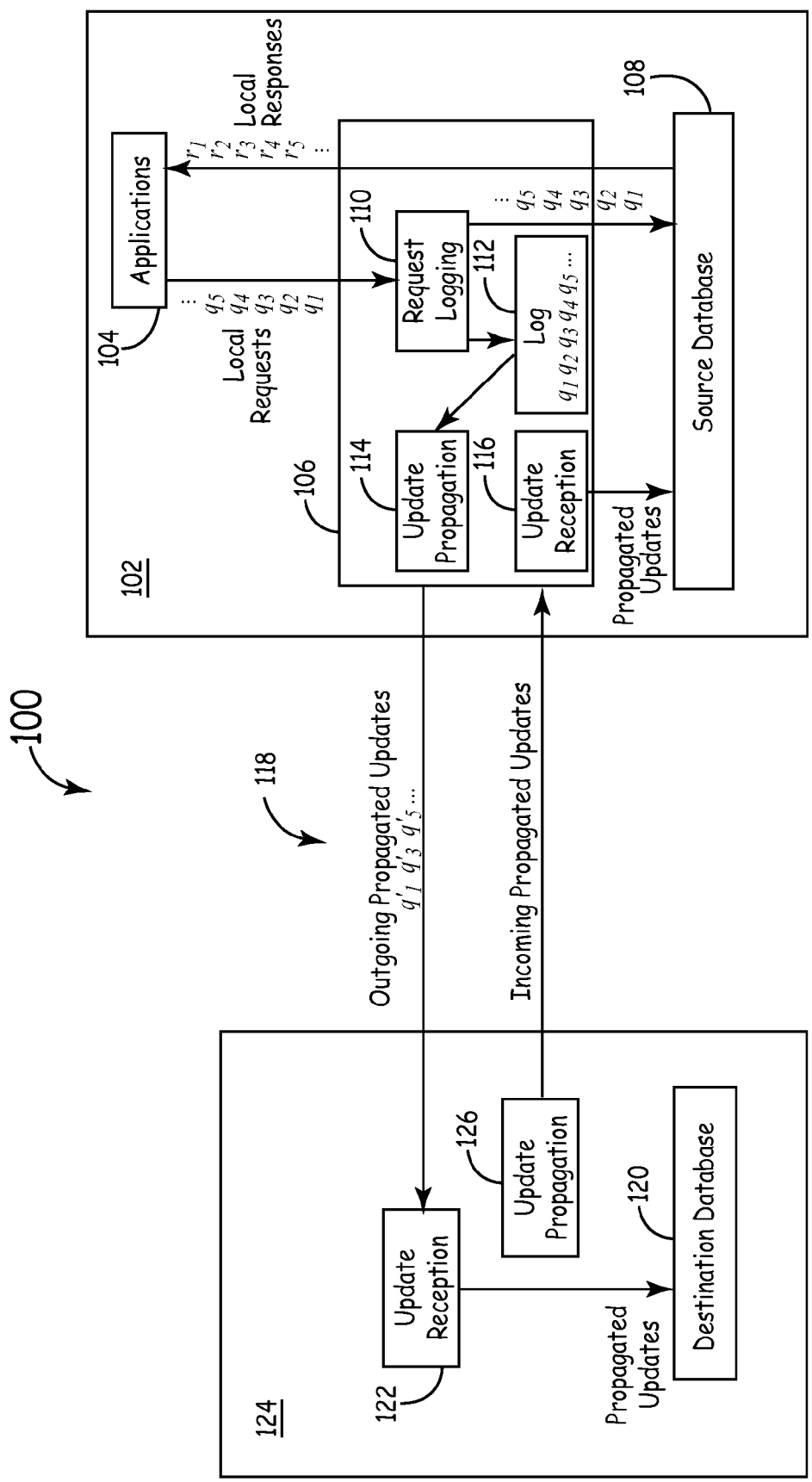
FIG. 1 is a diagram illustrating the synchronization of objects of one embodiment of the present invention.

FIG. 1 illustrates the components of a database system 102 of one embodiment of the present invention generally at 100. Within a database replication function 106, a request logging function 110 records the sequence of requests that local applications 104 send to a local information object 108. In one embodiment, local information object 108 comprises a source database 108. Record logging function 110 filters out any requests that do not actually cause a state change in local object 108, so that each logged request represents an update to local object 108. An update propagation function 114 determines which object states to propagate based on IQoS accuracy requirements selected by a database administrator or owner as disclosed in this specification. Update propagation function 114 transforms logged results into a compressed sequence of requests that will cause states of local object 108 to be propagated via communication link 118 to a destination object 120. In one embodiment, destination object 120 comprises a destination database 120. Update propagation function 114 sends the compressed sequence of requests to an update reception function 122 for destination object 120 based on IQoS propagation freshness requirements. In one embodiment, database system 102 further comprises an update reception function 116 that receives similar updates from one or more other database systems 124 and applies the updates to the local information object 108.

Although this specification discusses embodiments of the present invention in terms of database replicas, the approaches presented in the embodiments are valid for any information object that has a defined state and a set of operations by which applications can read and update that state. Such information objects may also include, but are not limited to a simple discrete variable, a collection of files, or a relational database.

An object's behavior is completely defined by its type $T=(S, s_0, Q, R, !, ?)$. S is the object's state space—the set of possible object values. S can range from a small set of enumerated choices to a very large, highly structured set defined by a relational, object-oriented or similar model. This structure is visible to applications only indirectly, by the object's response to each request. The object's initial state is $\epsilon$.

An application reads or updates the object by sending it a request and receiving a response. Q is the set of possible requests and R is the set of possible responses. Q and R can range from small to very large, defined in terms of request and response forms with variable-content fields.

Object behavior is deterministic, meaning that whenever an application sends a request q to the local object 108, the object's response r, and its state s' after executing the request, are completely determined by (i.e. functions of) the request q and the object state s prior to receiving the request. The response and state transition functions are denoted by the infix operators ? and !, so that $r=s?q$ and $s'=s!q$. The requests sent to an object are assumed to be executed in some serial order, or at least in a serializable fashion, and that the sequence of requests executed by an object can be recorded for use in replication.

As an example, in one embodiment, a simple object type Table consists of a single relational table with n columns, the first k of which are key columns. Keys in a database (such as key columns or key values) are typically used to uniquely identify an individual record such that no two records have a duplicate key value. Non-key column values have significance, and changes to non-key column values from one database state $s_i$ to another $s_j$ typically represent a change in some real world parameter (e.g., a checking account balance or remaining fuel in a fuel tank). In one embodiment, the example object type Table accepts four kinds of requests: $insert(x_1, \ldots, x_n)$, $delete(x_1, \ldots x_k)$, $set(x_1, \ldots x_k, i, x_j)$ where $k<i\leq n$ and $get(x_1, \ldots x_k, i)$ where $k<i\leq n$.

A state is a set of rows of the form $(x_1, \ldots, x_n)$ such that no two distinct rows have the same values for $x_1, \ldots, x_k$. The state space S is the set of all such sets of rows. It can be defined more precisely in terms of state variables. A state variable is an identifiable, updatable element of the state space S. State variables are used merely for type specification; the object's implementation may record state in a different way. In one embodiment, for type Table, the state variables are:

exists: $array(D_1, \ldots, D_k)$ of $\{0,1\}$ $col_i$: $array(D_1, \ldots, D_k)$ of $D_i$ for $k<i\leq n$ where $D_1, \ldots, D_n$ are the domains of columns $1, \ldots, n$. The state variable $exists(x_1, \ldots, X_k)$ indicates whether a row with key values $x_1, \ldots, x_k$ exists (1=yes, 0=no); the state variable $col_i(x_1, \ldots, x_k)$ holds the value of non-key column i for key $x_1, \ldots, x_k$. Strictly speaking, $col_i(x_1, \ldots, x_k)$ can be undefined if $exists(x_1, \ldots, x_k)=0$. The initial state has $exists(x_1, \ldots, x_k)=0$ for all possible key values.

Request Sequence Compression. The destination database 120 can be kept adequately fresh and accurate without applying each and every update that was applied to the source database 108. Initially, both source database 108 and destination database 122 have state $s_0$ according to their behavioral type. Applications 104 on source computer 102 send requests $q_1, q_2, q_3, q_4, q_5, \ldots$ to the source database 108, causing the database 108 to achieve new states $s_1, s_2, s_3, s_4, s_5, \ldots$ at times $t_1, t_2, t_3, t_4, t_5, \ldots$ In one embodiment, replication function 106 records these requests in a log 112 on the source computer 102. The update propagation function 114 applies a compression algorithm that transforms the logged requests into a compressed sequence of requests, say $q'_1, q'_3, q'_5, \ldots$, and sends these to the destination database 120. As a result, destination database 120 achieves a subsequence $s_1, s_3, s_5, \ldots$ of source database 108's states at times $t'_1, t'_3, t'_5, \ldots$ The compressed sequence of requests can be communicated at a lower cost than the sequence of requests originally applied to the source database.

In one embodiment, the compression algorithm starts with a sequence of requests recorded in the source computer's log 112, and repeatedly applies a set of compression transformations until no further transformation is possible. Each compression transformation replaces a consecutive subsequence of requests $q_1, \ldots, q_n$ by a subsequence $q'_1, \ldots, q'_m$ ($0 \leq m<n$). The source database 108's behavior type determines the set of permissible compression transformations. A compression transformation $q_1, \ldots, q_n \rightarrow q'_1, \ldots, q'_m$ is permissible if it satisfies two conditions. First, the transformation must cause the destination database 120 to achieve the same state as the source object 108 after executing the compressed sequence of requests. More precisely, $s!q'_1! \ldots !q'_m = s!q_1! \ldots !q_n$ for any state s (read as: a database state s operated on by a sequence of requests $q'_1$ through $q'_m$ results in the same resulting state as state s operated on by a sequence of requests $q_1$ through $q_n$) Second, the transformation must not cause the destination database 120 to achieve a state that the source database 108 did not achieve. The introduction of extraneous states in the destination database 120 would complicate the definition of accuracy. More precisely, s, $s!q'_1, s!q'_1!q'_2, \ldots, s!q'_1! \ldots !q'_m$ must be a subsequence of s, $s!q_1, s!q_1!q_2, \ldots, s!q_1! \ldots !q_n$ for any state s. A common kind of compression transformation is to eliminate a request that does not change the object's state.

Table 1 lists example compression transformations for an object type Table of one embodiment of the present invention.

TABLE 1

Example compression transformations.

| Original Sequence | Transformed Sequence |
|---|---|
| $insert(x_1, \ldots, x_n)$ $delete(x_1, \ldots, x_k)$ | (empty sequence) |
| $insert(x_1, \ldots, x_n)$ $set(x_1, \ldots, x_k, i, x'_i)$ | $insert(x_1, \ldots, x'_i, \ldots, x_n)$ |
| $set(x_1, \ldots, x_k, i, x'_i)$ $delete(x_1, \ldots, x_k)$ | $delete(x_1, \ldots, x_k)$ |
| $set(x_1, \ldots, x_k, i, x'_i)$ $set(x_1, \ldots, x_k, i, x''_i)$ | $set(x_1, \ldots, x_k, i, x''_i)$ |

In one embodiment, the compression algorithm reorders one or more commutative requests. Two requests q and q' commute if for any object state s, applying the requests in either order results in the same final object state and the responses to the requests:

s!q!q'=s!q'!q
s!q?q'=s!q'
s!q'!q=s!q

If requests don't commute, they are said to conflict. Requests with different key values $x_1, \ldots, x_k$ commute. So do set and get requests for different columns of the same row. The get operation has no effect on the object state, so two instances of the same get request also commute. Request commutativity permits reordering that can open further opportunities for compression. Assume that the request logging function 110 for a table object has eliminated get requests and failed insert/set/delete requests. The sequence can be reordered so that requests on the same row($x_1, \ldots, x_k$) object are adjacent. Furthermore, the set requests between an insert request and a delete request can be reordered so that set requests for the same column are adjacent. Once this reordering is done, the compression transformations can be applied to drastically reduce the number of requests that must be sent to the destination object.

Commutative requests can be reordered, compressed, and propagated independently. More significant state changes can be propagated immediately, while others are held back and possibly compressed further before being propagated. For example, an application may require higher accuracy for some object columns than for others.

In one embodiment, the source database 108 is a container object. When requests commute, such as requests with different key values $x_1, \ldots, x_k$, it suggests that the object's state space has some structure, and that the requests operate on different parts of the object. The object is behaving as a container object that has contained objects as part of its state.

The behavior type of a container object reveals a structure in the object's internal state space and an association between requests and specific parts of the state space. These properties are captured in a container specification.

Figure 2:
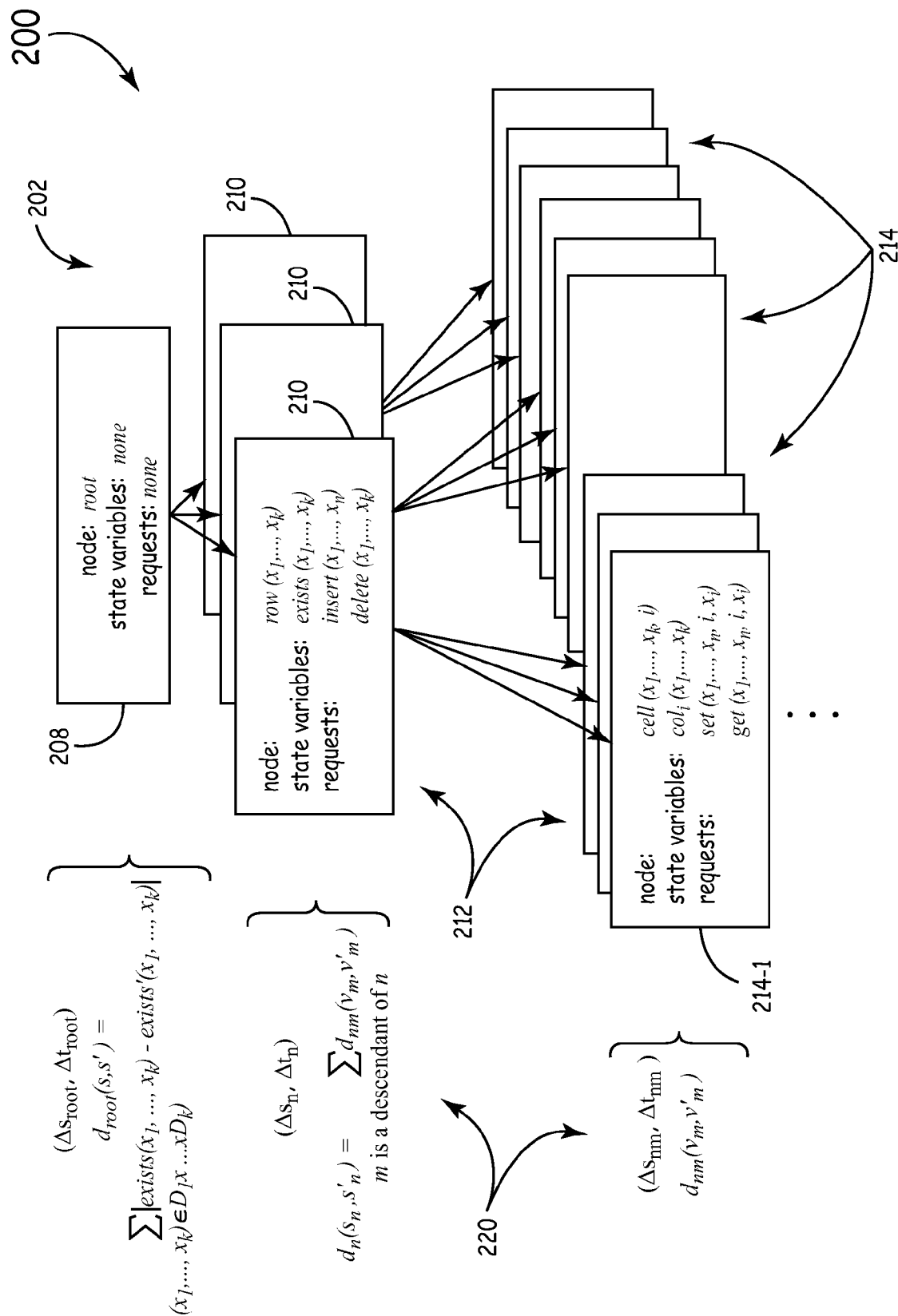
FIG. 2 is a diagram illustrating information quality of service definitions for a container object of one embodiment of the present invention.

FIG. 2 illustrates a container specification 200 for the above example object type Table for one embodiment of the present invention. A container specification, such as container specification 200, includes a containment tree 202, assignment of state variables to objects (or nodes) in the tree 208 and 212, and assignment of requests to object 208 and 212.

First, a container specification 200 for the above example object type Table includes a containment tree 202. A root object 208 represents the entire container object. In one embodiment, the root object is an object that contains a row ($x_1, \ldots, x_k$) object 210 for each key value ($x_1, \ldots, x_k$). The root object 208 has no assigned state variables or requests. The objects other than root object 208 represent contained objects 212. Each contained object 212 is identified by a name and zero or more "key" values.

Second, container specification 200, for the above example object type Table, assigns state variables to contained objects 212 in the containment tree 202. The state of an object 212 is held by the state variables assigned to that object and its descendants. In one embodiment, each row($x_1, \ldots, x_k$) object 210 is assigned the state variable exists($x_1, \ldots, x_k$). In one embodiment, each row($x_1, \ldots, x_k$) object 210 in turn contains descendants, which are one or more cell($x_1, \ldots, x_k$, i) objects 214 for k<i≦n. In turn, each cell($x_1, \ldots, x_k$, i) object 214 is assigned state variable $col_i$ ($x_1, \ldots, x_k$).

Third, container specification 200, for the above example object type Table, assigns every request q in Q to an object 212 in containment tree 202. Request q may be assigned to an object (for example, object 214-1) if 1) for any container object 208 states, the new state s!q and the response s?q are functions only of the state of contained object 214-1 and the state variables assigned to contained object 214-1's ancestors in the containment tree 202, and 2) any differences between the old state s and the new state s!q must be in the state of contained object 214-1. Whenever two requests q and q' are assigned to independent contained objects 212 (distinct contained objects, neither of which is an ancestor of the other in the containment tree), the requests must commute, because neither can update a state variable that the other can read or update. However, it is possible for two commutative requests to be assigned to objects that are not independent. Illustrated in FIG. 2, in one embodiment for the above example object type Table, each row($x_1, \ldots, x_k$) object 210 is assigned requests insert($x_1, \ldots, x_k$) and delete($x_1, \ldots, x_k$) and each cell($x_1, \ldots, x_k$, i) object 214 is assigned requests set($x_1, \ldots, x_k$, i, $x_i$) and get($x_1, \ldots, x_k$, i).

In one embodiment, request reordering can be controlled by using an appropriate container specification 200. If two requests are assigned to independent contained objects 212, they must commute. By making this assignment, the system designer is stating that reordering these requests is acceptable. Alternatively, the system designer may assign the requests to the same object, or to distinct objects, one of which contains the other. This indicates that reordering is not acceptable even if the requests are commutative.

Figure 3A:
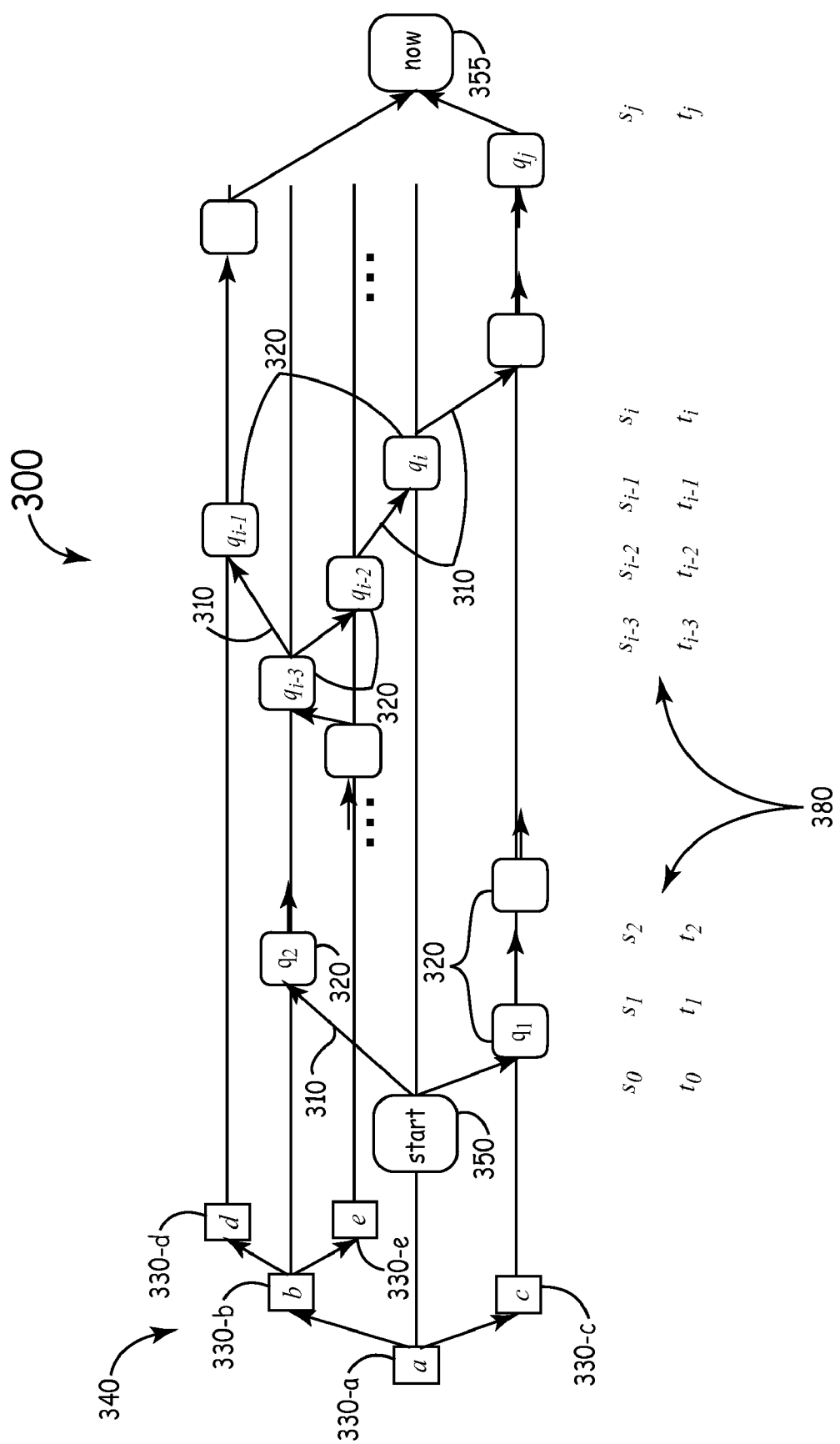
FIGS. 3a and 3b are diagrams illustrating propagation of container objects of one embodiment of the present invention.

Given a container specification, a sequence of requests can be transformed to a partially-ordered set of requests. In FIG. 3a, a partially-ordered set of requests for a container specification 300 for one embodiment of the present invention is illustrated. A partial order is a set of sequencing constraints 310 among the requests 320, indicated by the arrows between requests, selected by the database system designer.

A partial order is a set of sequencing constraints among requests that represents all permissible opportunities for request reordering. Requests 320 are arranged in a horizontal position that reflects their order in log 112, and a vertical position that reflects their assignment to objects 330-a through 330-e in a containment tree 340. For convenience, special nodes start 350 and now 355 are shown. The partial order is constructed by update propagation function 114, by placing a sequencing constraint 310 (indicated by the arrows) between any two requests 320 that are assigned to the same object 330-a through 330-e in the containment tree 340 or assigned to two objects one of which is an ancestor of the other (e.g. object 330-b is an ancestor of objects 330-d and 330-e).

Figure 3B:
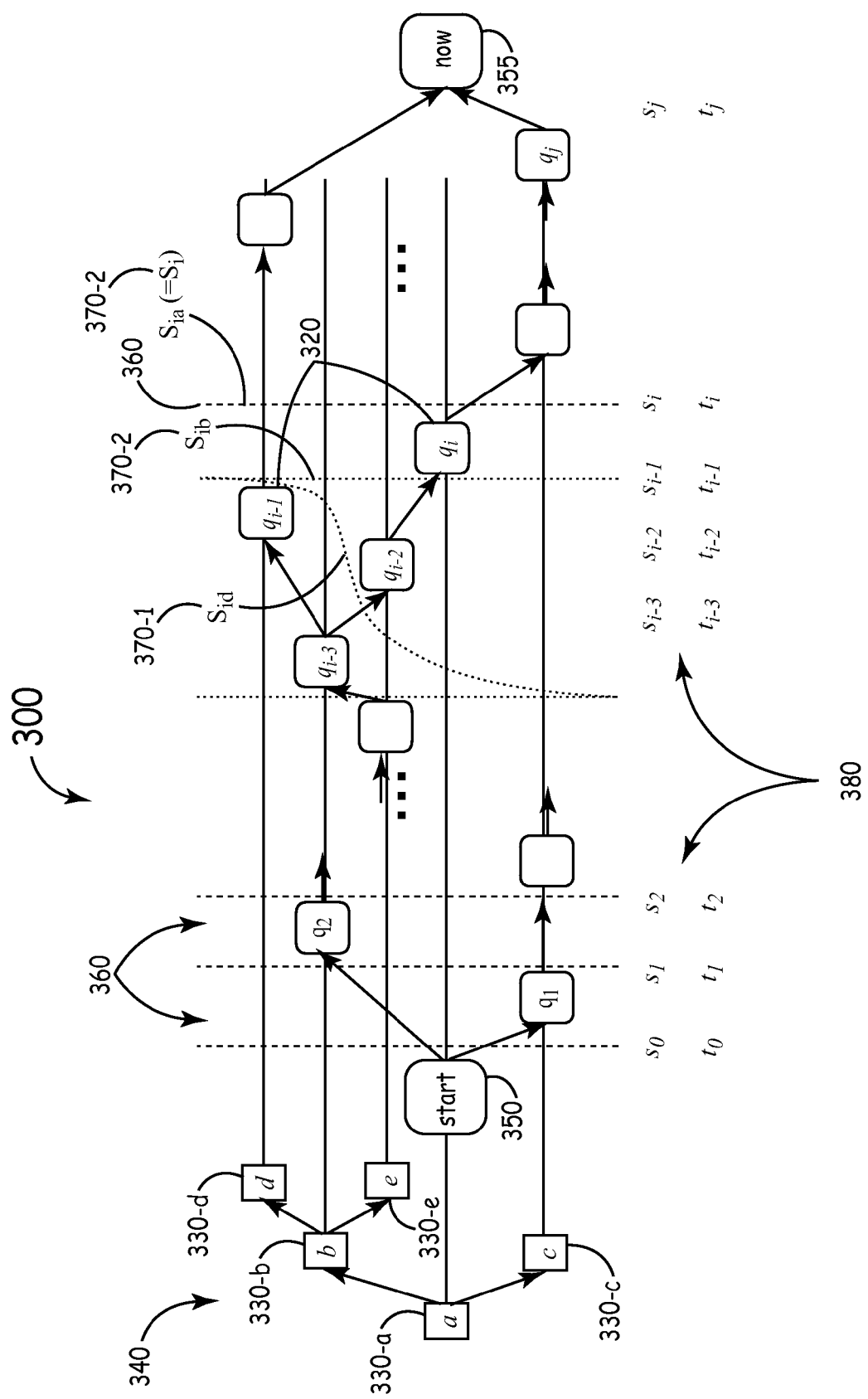

Object states are represented in this graph by dashed lines 360 and dotted lines 370-1, 370-2 and 370-3, as illustrated in FIG. 3b. Dashed lines 360 represent the states of all objects 330-a through 330-e in source object 108, from state so at time to, to the current source object 108 state $s_j$ at time $t_j$ (shown generally at 380). Dotted lines 370-1, 370-2 and 370-3 represent other states that could be propagated to the destination object. When replicating a container object, it is possible to propagate a state of the entire container object (i.e. object 303-a and its descendant objects 303-b through 303-e) or of any of its contained objects (i.e. objects 303-b through 303-e).

For any state $s_i$ of the source object 108 at time $t_i$, $s_{in}$ is the corresponding state of one of the contained objects n (i.e. objects 303-b through 303-e). For example, in one embodiment, $S_{1b}$ is the state of object 330-b at time $t_1$. To propagate state $s_{in}$, update propagation function 114 identifies the highest k≦i such that request $q_k$ (one of requests 320) is assigned to object n (i.e. one of objects 330-a through 330-e) or one of its descendants. It then propagates request $q_k$ and all its predecessors in the partial order that have not yet been sent to destination object 120. FIG. 3b illustrates one embodiment where requests 320 must be sent to propagate state $s_{i_d}$ 370-1, state $s_{i_b}$ 370-2, and $s_{i_a}$ (=$s_i$) 370-3. In this embodiment, to propagate state $s_{i_b}$, request sequence $q_{i-3}$, $q_{i-2}$, $q_{i-1}$ or $q_{i-3}$, $q_{i-1}$, $q_{i-2}$ must be sent. Notice that if $q_{i-1}$ is propagated before $q_{i-2}$, the destination object will achieve a state that the source object never achieved.

In one embodiment, update propagation function 114 propagates requests 320 in an order consistent with the partial order. In one embodiment, update propagation function 114 compresses requests 320 consistent with the partial order prior to propagation to destination object 120.

Figure 4:
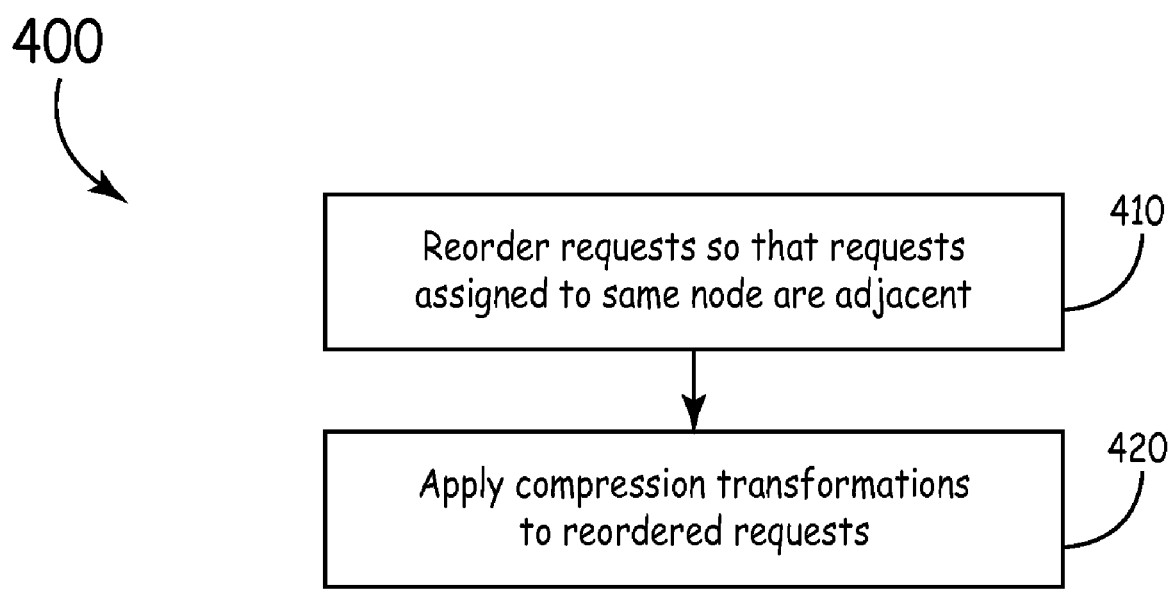
FIG. 4 is a flow diagram illustrating container object request compression of one embodiment of the present invention.

In FIG. 4, a method for compressing a sequence of requests 400 affecting source object 108, where source object 108 is a container object, before performing an update propagation to a destination object 120, is disclosed. The partial order of requests induced by a container specification allows requests to be reordered to allow further compression. In one embodiment, requests are first reordered so that requests that are assigned to the same node in the containment tree are adjacent to each other (410). The relative order of requests assigned to the same node, and requests assigned to distinct but not independent nodes, must be maintained. Then, apply the compression transformations as described earlier (420). The destination object 120 must have the same type as source object 108 and therefore also be a container object Information Quality of Service (IQoS). Information quality of service for database state propagation is measured in terms of freshness and accuracy. Freshness measures how long it takes updates to propagate from source database 108 to destination database 120. Accuracy measures how closely destination databases 120's states track those of source database 108. If system 100's replication freshness and accuracy requirements can be explicitly defined, the replication function 106 can exploit the flexibility provided by those requirements to optimize use of communications network 118 resources.

IQoS Accuracy Requirements. The IQoS accuracy requirement controls the selection of which states will be propagated from the source database 108 to the destination database 120. A source database 108 state must be propagated only if the change from the previously propagated state is large enough ($\Delta s$) and the state has persisted for a sufficient time interval ($\Delta t$). The two parameters ($\Delta s$, $\Delta t$) constitute the accuracy IQoS requirement. In one embodiment, the accuracy requirement ($0$, $\Delta t$) causes every state that persists for a time interval of $\Delta t$ to be propagated to destination database 120. In one embodiment, the accuracy requirement ($\Delta s$, $0$) causes every state representing a change of magnitude $\Delta s$ or larger to be propagated to the destination database 120. In one embodiment, the accuracy requirement ($0$, $0$) causes every state to be propagated to destination database 120.

In other embodiments, the two accuracy parameters ($\Delta s$, $\Delta t$) are chosen to reduce network resource costs. In one embodiment the accuracy requirement parameter $\Delta t$ is a function $\Delta t(\Delta s)$. With $\Delta t$ expressed as this function, a state change of magnitude $\Delta s$ must be propagated if it persists for a time interval of at least $\Delta t(\Delta s)$ (i.e., the accuracy requirement fully expressed is ($\Delta s$, $\Delta t(\Delta s)$).) In one embodiment, this function is monotonically non-increasing, so that larger changes are propagated sooner, but smaller changes are propagated over a relatively longer period.

In one embodiment, the magnitude of an object state change is measured using a distance function. A distance function $d(s, s')$ returns a non-negative real number and has the following properties:

$d(s, s')=0$ if and only if $s=s'$
$d(s, s')=d(s', s)$
$d(s, s')+d(s', s'')\geq d(s, s'')$ The sequence of source database 108 states to be propagated to destination database 120 is determined as follows. State $s_0$ (the initial state of both the source database 108 and destination database 120) is assumed to be "propagated" because both the source and destination objects are initially in this state. Suppose that source database 108 state $s_i$ has previously been propagated to destination database 120, and that $t$ is the current time. Source database 108 state $s_j$ is the next state to propagate to destination database 120 if $j$ is the lowest integer greater than $i$ that meets the propagation condition:

$$d(s_i, s_j) \geq \Delta s \text{ and } t \geq t_j + \Delta t. \tag{1}$$

In other words, the propagation condition is met if the magnitude of the source database 108 state change from $s_i$ to $s_j$ is greater than or equal to the parameter $\Delta s$, and the state $s_j$ has existed on the source database 108 for a time greater than or equal to $\Delta t$ without being propagated to the destination database 120.

In one embodiment, the following function defines a distance function for the previously discussed example object type Table:

$$d(s, s') = \sum_{(x_1, \ldots, x_k) \in D_1 \times \ldots \times D_k} \left( |exists(x_1, \ldots, x_k) - exists'(x_1, \ldots, x_k)| + \sum_{\substack{k < i \leq n \\ exists(x_1, \ldots, x_k)=1 \\ exists'(x_1, \ldots, x_k)=1}} d_i(col_i(x_1, \ldots, x_k), col'_i(x_1, \ldots, x_k)) \right)$$

Here, the state variables exists and $col_i$ represent state s, and state variables exists' and $col'_i$ represent state s'. In this embodiment, the distance function measures the difference between two states s and s' as the sum of two terms: the number of key values that exist in either s or s', but not both, and the distances between non-key column values (measured by a more primitive distance function $d_i$), summed over all columns and all key values that occur in both states. In other embodiments, variants of this distance function apply weights to the various terms, representing their application significance.

The update propagation function must evaluate the propagation condition (1) above, which references past states of the source object in the term $d(s_i, s_j)$. Storing a complete representation of past object states is not always practical, but is also not always necessary. In many cases, much less information needs to be stored. For example, the distance function above is a sum of terms, where each term references a single table row and possibly a single table column. Each request affects a single row or a single column, so it causes an incremental change to the distance function. To determine this incremental change, it is sufficient to record the old value $x_i$ with each set($x_1, \ldots, x_k, i, x'_i$) request and the old non-key values $x_{k+1}, \ldots, x_n$ with each delete($x_1, \ldots, x_k$) request. Using just this information, it is possible to compute the distance $d(s_i, s_j)$ by accumulating the effect of requests $q_{i+1}, \ldots, q_j$.

In one embodiment, IQoS accuracy requirements are defined for a container object. In this embodiment, the source object 108 starts in state so and achieves states $s_1, s_2, \ldots$, at times $t_1, t_2 \ldots$ in response to requests $q_1, q_2, \ldots$. The IQoS accuracy requirement $(\Delta s_n, \Delta t_n)$ controls state propagation for a container object 208 or contained object 212 as follows. Suppose that $S_{jn}$ is a source object 108 state, $s_{in}$ is the latest previous state that the replication function has propagated to the destination object, and t is the current time. State $s_{jn}$ must be propagated if it meets the propagation condition:

$$d_n(s_{in}, s_{jn}) \geq \Delta s_n \text{ and } t \geq t_{jn} + \Delta t_n \qquad (2)$$

For any state $s_i$ of the source object 108, $s_{in}$ is the corresponding state of contained object n and $t_{in}$ is the time when contained object n achieved this state. When object n represents the container object, this propagation condition (2) is the same as propagation condition (1) stated earlier for arbitrary objects. For contained objects, the definition is slightly different in that $t_{jn}$ may be earlier than $t_j$. Specifically, choose the largest $k \leq j$ such that $q_k$ is assigned to an object n (i.e. node 108 or 112) or one of its descendants in the containment tree 202. That is, $q_k$ is the latest request reflected in state $s_j$ that altered the state of object n. Then, $t_{jn} = t_k$.

As stated earlier, IQoS accuracy requirements control the selection of states to be propagated from the source to the destination object 120. In one embodiment each object 208 and 212 in a container specification 200 has an associated IQoS accuracy requirement $(\Delta s_n, \Delta t_n)$ and an associated IQoS freshness requirement $T_{pn}$, to control state propagation for that object according to application needs determined by the database designer. In another embodiment, one or more of the objects 208 and 212 in a container specification 200 have an associated IQoS accuracy requirement $(\Delta s_n, \Delta t_n)$ and associated distance function $d_n$ (shown generally at 220).

In one embodiment, the following distance function is assigned to the root container object 208:

$$d_{root}(s, s') = \sum_{(x_1, \ldots, x_k) \in D_1 \times \ldots \times D_k} |exists(x_1, \ldots, x_k) - exists'(x_1, \ldots, x_k)|$$

and separate distance functions $d_i: D_i \times D_i \to R$ are assigned to one or more of the contained objects 212.

In one embodiment, when n represents a container object, each distance function $d_n$ is of the form:

$$d_n(s_n, s'_n) = \sum_{m \text{ is a descendant of } n} d_{nm}(v_m, v'_m)$$

where $v_m$ represents the state variables assigned to subspace m and $d_{nm}$ is the contribution of subspace m to subspace n's distance function. The descendants of subspace n include n itself.

IQoS Freshness Requirements. The IQoS freshness requirement places a propagation delay bound $T_p$ on the propagation time for all propagated states $s_i$ (i.e. $t'_i \leq t_i + T_p$). In general, the larger the delay bound, the more flexibility the communications network 118 has in allocating resources to propagate the requests and the more resilient the replication function 106 is to temporary network unavailability. In other words, if an update can be propagated from the local object 108 to the destination object 120 over a longer period of time, then fewer network 118 resources, at a given point in time, are required to propagate the update. The IQoS freshness requirement $T_p$ defines how long of a propagation time is tolerable once $d(s_i, s_j) \geq \Delta s$. For a container object, the IQoS freshness requirement $T_{pn}$ states that $s_{jn}$ must be realized in the destination object 120 by time $t_{jn} + T_{pn}$.

According to the IQoS freshness requirement, any propagated state $s_j$ must be realized in the destination object 120 at time $t'_j \leq t_j + T_p$. In the propagation condition (i.e. $d(s_i, s_j) \geq \Delta s$ and $t \geq t_j + \Delta t$), t references the current time. Accordingly, update propagation function 114 must wait until the current time t equal $t_j + \Delta t$ to determine whether state $s_j$ should be propagated. The update propagation function 114 operates asynchronously with respect to local applications 104 that update local object 108. A simple approach is to execute update propagation function 114 cyclically, with period $T_c$. The database designer should choose period $T_c$ so that the IQoS freshness requirement can be met as disclosed in this specification.

The constraints on $T_c$ are as follows: Let $T_r$ be the time required to realize a state $s_j$ in destination object 120, once update propagation function 114 begins execution. In a networking environment, especially one with intermittent connectivity such as a wireless network, this time cannot be fixed with certainty. Therefore, assume a value for $T_r$ that can be met with sufficient assurance for the particular system and applications. In the worst case, update propagation function 114 begins execution just before time $t_j + \Delta t$. Because the propagation condition $d(s_i, s_j) \geq \Delta s$ and $t \geq t_j + \Delta t$ is not met, update propagation function 114 waits until time $t_j + \Delta t + T_c$ to determine that state $s_j$ should be propagated to destination object 120. The state $s_j$ is then realized in destination object 120 at time $t_j + \Delta t + T_c + T_r$. Because $t_j + \Delta t + T_c + T_r$ should not exceed $t_j + T_p$, then $T_c$ should be less than or equal to $T_p - T_r - \Delta t$. Accordingly, there are three cases to consider. First, if $T_r > T_p$, the IQoS freshness requirement clearly can't be met regardless of the choice of $T_c$. Second, if $T_r < T_p - \Delta t$, then choosing $T_c = T_p - T_r - \Delta t$ will satisfy the IQoS freshness requirement. Third, if $T_p - \Delta t \leq T_r \leq T_p$, the IQoS freshness requirement can only be met by propagating additional states besides those identified by the propagation condition. In that case, update propagation function 114 can choose a smaller value of $\Delta t$ so that $T_r < T_p - \Delta t$ and the second case holds.

For embodiments having container objects, because each node 208 and 212 can have its own IQoS freshness requirement $T_{pn}$ and accuracy requirement $(\Delta s_n, \Delta t_n)$, in one embodiment, $T_c$ is determined by computing a $T_{cn}$ for each node, as describer above, and letting $T_c$ equal the minimum valued $T_{cn}$.

Figure 5:
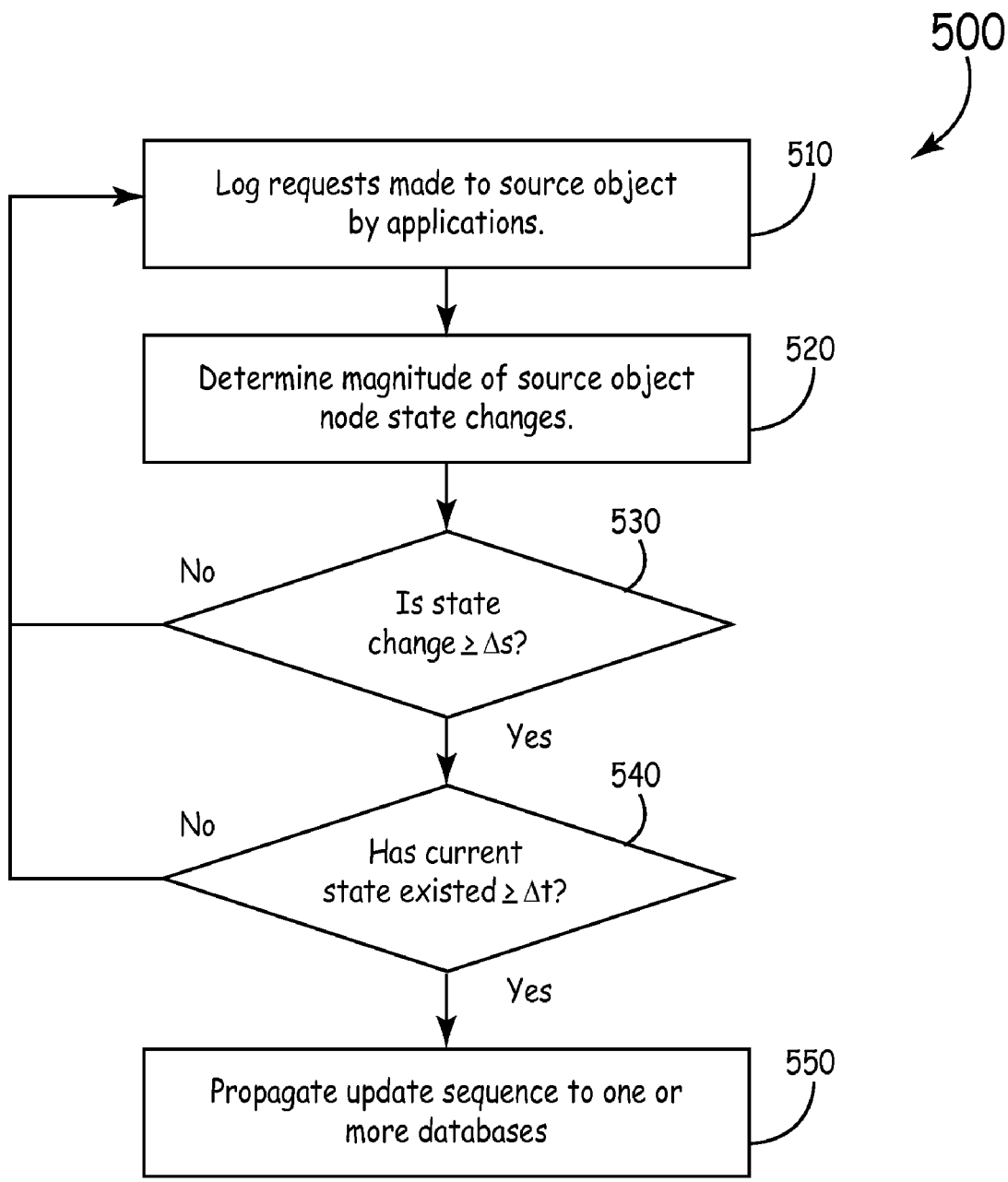
FIG. 5 is a flow diagram illustrating a method of one embodiment of the present invention.

In FIG. 5, a method for propagating database updates 500 of an embodiment of the present invention is illustrated. The method starts by logging requests made to a source object by one or more applications (510). The magnitude of the source object state change since the time of the previous update propagation is determined (520). If the magnitude of the source object state change is greater than or equal to an information quality of service accuracy parameter $\Delta s$ (530) and if the current source object state has existed for a time greater than or equal to an information quality of service accuracy parameter $\Delta t$ without being propagated to the destination object (540), then the method proceeds with propagating a sequence of updates based on the logged requests to one or more destination databases (550). In some embodiments, the magnitude of the source object state change is determined by a distance function. In some embodiments, the method further comprises applying a compression algorithm that transforms the logged requests into a compressed sequence of requests to produce the sequence of updates. In some embodiments, the method further comprises determining how long of a duration of time is tolerable to propagate the source object state to the one or more destination objects once the magnitude of the source object state change is greater than or equal to Δs, and completing the propagation of the sequence of updates within that duration of time.

Figure 6:
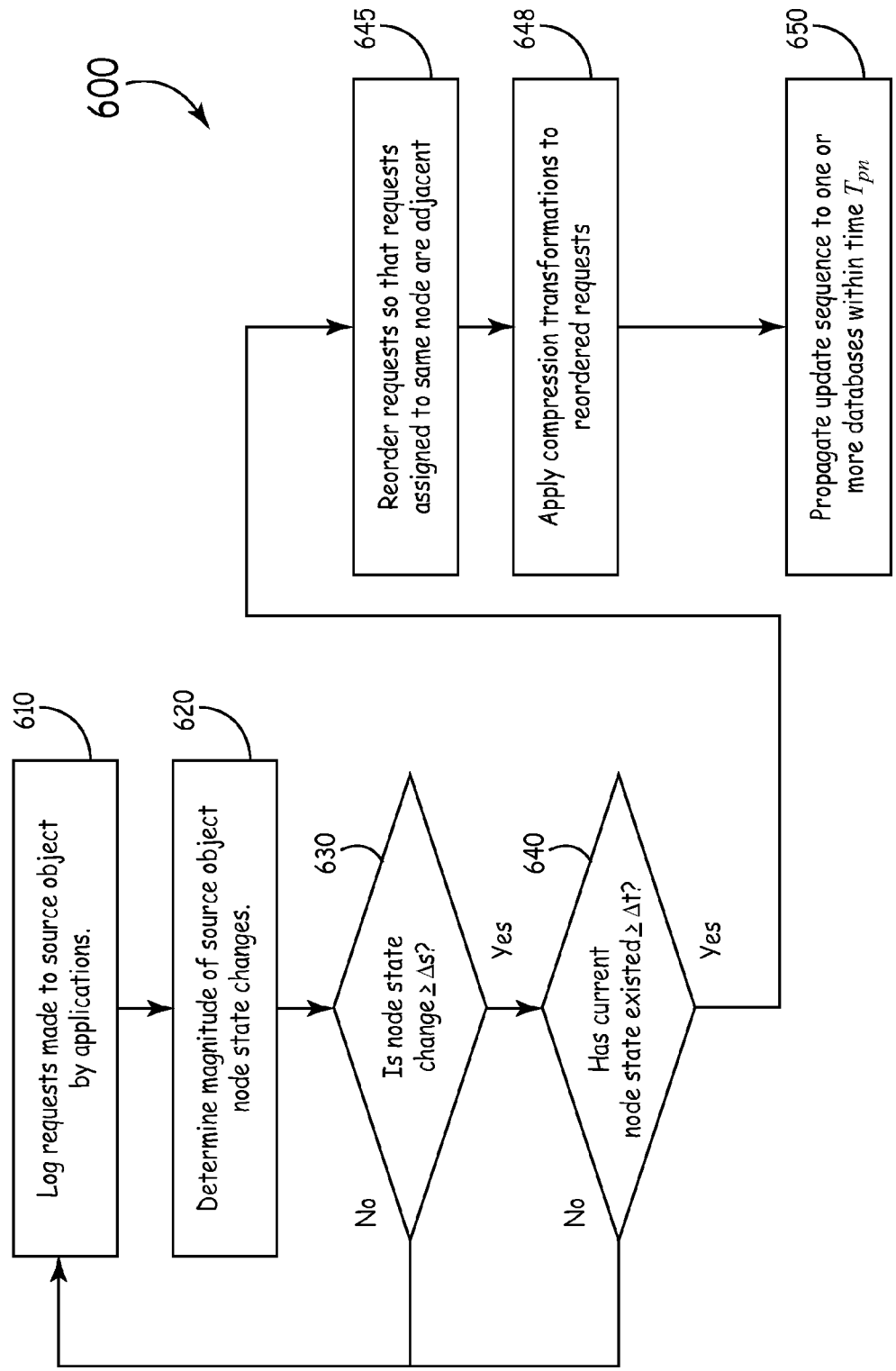
FIG. 6 is a flow diagram illustrating another method of one embodiment of the present invention.

In FIG. 6, a method for propagating database updates 600 for a container object of an embodiment of the present invention is illustrated. The method starts by logging requests made to a source object by one or more applications (610). The magnitude of one or more source object node state change since the time of the previous update propagation is determined (620). If the magnitude of the one or more source object node state change is greater than or equal to an information quality of service accuracy parameter Δs defined for the one or more nodes (630) and if the current source object node state has existed for a time greater than or equal to an information quality of service accuracy parameter Δt (defined for the one or more nodes) without being propagated to the destination object (640), then the method proceeds with reordering requests so that requests assigned to the same node are adjacent (645). Next, compression transformations are applied to the reordered request (648) and the sequence of updates is propagated based on the compressed requests to one or more destination databases within time $T_{pn}$ after the magnitude of the one or more source object node state change is greater than or equal to Δs (650). In one embodiment, the magnitude of the source object node state change is determined by a distance function.

Several means are available to implement the database replication embodiments of the current invention. These means include, but are not limited to, digital computer systems, programmable controllers, or field programmable gate arrays. Therefore other embodiments of the present invention are program instructions resident on computer readable media which when implemented by such controllers, enable the controllers to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A database system, the system comprising:
   a computer executing a database replication function for a local object and one or more destination objects, where one or more local applications make requests to the local object, the database replication function comprising:
   a request logging function for recording a sequence of requests sent by the one or more local applications to the local object; and
   an update propagation function, wherein the update propagation function determines which local object states to propagate to the one or more destination objects, based on information quality of service accuracy requirements;
   wherein the update propagation function determines which local object states to propagate by determining whether present local object state meets a propagation condition; and
   wherein the information quality of service accuracy requirements include parameters (Δs, Δt) and wherein the propagation condition is met if a magnitude of the local object state change from $s_i$ to $s_j$ is greater than or equal to the parameter Δs, and the state $s_j$ that causes the local object state change from $s_i$ to $s_j$ to be greater than or equal to the parameter Δs has existed on the local object for a time greater than or equal to Δt without being propagated to the destination object.

2. The database system of claim 1, wherein the request logging function further filters out requests that do not cause a state change in the local object and to record a sequence of requests sent by the one or more local applications to the local object that do cause a state change in the local object.

3. The database system of claim 1, where Δt is a function of Δs such that larger local object state changes are propagated sooner than relatively smaller changes.

4. The database system of claim 1, wherein the magnitude of the local object state change from $s_i$ to $s_j$ is measured using a distance function.

5. The database system of claim 1, wherein the update propagation function propagates a first local object state to the destination object by outputting a sequence of updates based on a sequence of requests from the request logging function.

6. The database system of claim 5, wherein the update propagation function applies a compression algorithm that transforms the sequence of requests from the request logging function into a compressed sequence of requests to produce the sequence of updates.

7. The database system of claim 6, wherein the compression algorithm applies a set of compression transformations to the sequence of requests from the request logging function interactively.

8. The database system of claim 7, wherein the compression algorithm reorders one or more commutative requests.

9. The database system of claim 7, wherein the update propagation function further propagates a local object state to the destination object based on information quality of service timing requirements.

10. The database system of claim 9, wherein the update propagation function is executed cyclically, with a cycle period chosen so that the information quality of service timing requirements are not exceeded.

11. The database system of claim 1, wherein the local object and the destination object are both container objects.

12. A database system comprising:
   a first computer having a source object, the source object having a container object structure, the source object further having one or more contained objects;
   at least one second computer having one or more destination objects, the one or more destination object having the same container object structure as the source object;
   the first compute executing one or more local applications, the one or more local applications making requests to the source object;
   a request logging function recording a sequence of requests sent by the one or more local applications to the source object;
   an update propagation function, wherein the update propagation function determines which source object states to propagate to the one or more destination objects, based on information quality of service accuracy requirements;
   wherein the update propagation function determines which source object states must be propagated by determining whether one or more of the contained objects of the source object state meet a propagation condition, wherein the information quality of service accuracy requirements include parameters ($\Delta s$, $\Delta t$) for one or more of the contained objects, wherein the propagation condition for a contained object is met if the magnitude of the contained object state change from $s_i$ to $s_j$ is greater than or equal to the parameter $\Delta s$, and the state $s_j$ that causes the contained object state change from $s_i$ to $s_j$ to be greater than or equal to the parameter $\Delta s$ has existed on the contained object for a time greater than or equal to $\Delta t$ without being propagated to the destination object, and wherein the magnitude of the contained object state change from $s_i$ to $s_j$ is measured using a distance function.

13. The database system of claim 12, wherein the request logging function further filters out requests that do not cause a state change in the source object and records a sequence of requests sent by the one or more applications to the source object that do cause a state change in the source object.

14. The database system of claim 12 wherein the update propagation function propagates a source object state to the destination object by outputting a sequence of updates based on a sequence of requests from the request logging function, wherein the update propagation function transforms the sequence of requests from the request logging function into a partially-ordered set of requests based on a container specification, wherein the update propagation function applies a compression algorithm that transforms the partially-ordered set of requests into a compressed sequence of requests to produce the sequence of updates, and wherein the update propagation function is executed cyclically, with a cycle period chosen so that the information quality of service timing requirements are not exceeded.

15. The database system of claim 12, further comprising:

an update reception function, wherein the update reception function is adapted to update the source object based on object states received from the one or more destination objects.

16. A method for propagating database updates, the method comprising:

logging requests made to a source object by one or more applications, the source object stored on a computer readable medium;

determining a magnitude of a source object state change since time of a most recent previous update propagation;

determining when the magnitude of the source object state change is greater than or equal to an information quality of service accuracy parameter $\Delta s$; determining when the present source object state causes the magnitude of the source object state change to be greater than or equal to the information quality of service accuracy parameter $\Delta s$ for a time greater than or equal to an information quality of service accuracy parameter $\Delta t$ without being propagated to the destination object; and propagating a sequence of updates based on the logged requests to one or more destination objects, when the magnitude of the source object state change is greater than or equal to $\Delta s$ and the present source object state has existed on the source object for a time greater than or equal to $\Delta t$ without being propagated to the one or more destination objects.

17. The method of claim 16, further comprising:

applying a compression algorithm that transforms the logged requests into a compressed sequence of requests to produce the sequence of updates.

18. The method of claim 16, wherein the magnitude of the source object state change is determined by a distance function.

19. The method of claim 16, further comprising:

determining how long of a duration of time is tolerable to propagate the source object state to the one or more destination objects once the magnitude of the source object state change is greater than or equal to $\Delta s$, and wherein the propagating a sequence of updates is completed with that duration of time.

20. A method for propagating database updates, the method comprising:

logging requests made to a source object by one or more applications, the source object stored on a computer readable medium;

periodically determining when a magnitude of a source object state change, since a time of a most recent previous update propagation, is greater than or equal to an information quality of service accuracy parameter $\Delta s$ and when a present source object state has existed on the source object for a time greater than or equal to an information quality of service accuracy parameter $\Delta t$ without being propagated to the destination object;

when the magnitude of the source object state change is greater than or equal to $\Delta s$ and the present source object state causes the magnitude of the source object state change to be greater than or equal to the information quality of service accuracy parameter $\Delta s$ has existed on the source object for a time greater than or equal to $\Delta t$ without being propagated to the one or more destination objects, applying a compression algorithm that transforms the logged requests into a compressed sequence of requests; and propagating the compressed sequence of request to one or more destination objects, wherein the cycle period for periodically determining the magnitude of the source object state change is chosen so that information quality of service timing requirements are not exceeded.

21. A method for propagating database updates, the method comprising:

logging requests made to a source object by one or more applications, the source object stored on a computer readable medium;

determining a magnitude of a source object state change since a time of a most recent previous update propagation;

determining when the magnitude of the source object state change is greater than or equal to an information quality of service accuracy parameter $\Delta s$; and when the magnitude of the source object state change is greater than or equal to $\Delta s$ and after a present source object state causes the magnitude of the source object state change to be greater than or equal to the information quality of service accuracy parameter $\Delta s$ has existed on the source object for a time greater than or equal to $\Delta t$, propagating a sequence of updates based on the logged requests to one or more destination databases.

22. A method for propagating database updates, the method comprising:

logging requests made to a source object by one or more applications, the source object stored on a computer readable medium;

determining a magnitude of a source object state change since a time of a most recent previous update propagation;

determining when a magnitude of the source object state change is greater than or equal to an information quality of service accuracy parameter $\Delta s$;

when the magnitude of the source object state change is greater than or equal to $\Delta s$ and after a present source object state causes the magnitude of the source object state change to be greater than or equal to the information quality of service accuracy parameter $\Delta s$ for a time greater than or equal to $\Delta t$, applying a compression algorithm that transforms the logged requests into a compressed sequence of requests to produce the sequence of updates; and propagating the compressed sequence of updates based on the logged requests to one or more destination databases.

23. A computer-readable medium having computer-executable instructions for performing a method for propagating database updates, the method comprising:

logging requests made to a source object by one or more applications;

determining a magnitude of a source object state change since the time of a most recent previous update propagation;

determining when the magnitude of the source object state change is greater than or equal to an information quality of service accuracy parameter $\Delta s$ ;

determining when a present source object state causes the magnitude of the source object state change to be greater than or equal to the information quality of service accuracy parameter $\Delta s$ for a time greater than or equal to an information quality of service accuracy parameter $\Delta t$ without being propagated to the destination object; and propagating a sequence of updates based on the logged requests to one or more destination databases, if the magnitude of the source object state change is greater than or equal to $\Delta s$ and the present source object state has existed on the source object for a time greater than or equal to $\Delta t$ without being propagated to the one or more destination objects.

24. The method of claim 23, further comprising:

applying a compression algorithm that transforms the logged requests into a compressed sequence of requests to produce the sequence of updates.

25. The method of claim 23, wherein the magnitude of the source object state change is determined by a distance function.

26. The method of claim 23, further comprising:

determining how long of a duration of time is tolerable to propagate the source object state to the one or more destination objects once the magnitude of the source object state change is greater than or equal to $\Delta s$ , and wherein the propagating a sequence of updates is completed with that duration of time.

* * * * *

UNITED STATES PATENT AND TRADEMARK OFFICE
CERTIFICATE OF CORRECTION

PATENT NO. : 7,596,585 B2 Page 1 of 1
APPLICATION NO. : 10/980778
DATED : September 29, 2009
INVENTOR(S) : James P. Richardson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,596,585 B2 | Page 1 of 1 |
| APPLICATION NO. | : 10/980778 | |
| DATED | : September 29, 2009 | |
| INVENTOR(S) | : Richardson | |

It is certified that error appears in the above-identified patent and that said Letters Patent is hereby corrected as shown below:

At Claim 20, Column 16, Lines 29 and 30, delete "has existed on the source object"

At Claim 21, Column 16, Lines 56 and 57, delete "has existed on the source object"

Signed and Sealed this
Twenty-eighth Day of February, 2012

David J. Kappos
*Director of the United States Patent and Trademark Office*